United States Patent Office 3,385,878
Patented May 28, 1968

3,385,878
CYCLOPOLYSILOXANES
Tse C. Wu, Waterford, N.Y., assignor to General Electric Company, a corporation of New York
No Drawing. Filed Mar. 4, 1965, Ser. No. 437,286
5 Claims. (Cl. 260—448.2)

ABSTRACT OF THE DISCLOSURE

Hexaorganocyclotrisiloxanes and octaorganocyclotetrasiloxanes are disclosed in which two or three of the diorgano groups contain two monovalent aryl groups and in which one of the diorganosiloxane units contains two para-phenoxy phenyl groups. These compounds are useful in the formation of high molecular weight silicone polymers useful as coating materials.

This invention relates to cyclopolysiloxanes substituted with groups which are stable at high temperature. More particularly, this application relates to cyclopolysiloxanes having the structure:

(1)
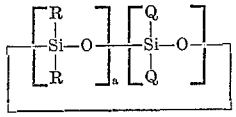

where R is a monovalent aryl group, Q is the para-phenoxyphenyl group having the structure:

(2)
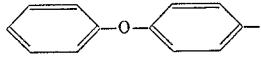

and $a$ is an integral number of from 2 to 3, inclusive.

The high temperature stability of organopolysiloxanes formed of diphenylsiloxy units is extremely valuable. However, such compounds are generally extremely brittle and are insoluble in most organic solvents. An extremely valuable coating material would be one which retains the high temperature stability of the all-phenyl-substituted organopolysiloxane and is also soluble in common organic solvents so as to allow easy application. It has unexpectedly been discovered that a polymer formed from the cyclopolysiloxane described above retains all the thermal stability advantages of the all-phenyl system, but, in addition, is soluble in organic solvents, such as trichlorethylene and benzene. Thus, application of the material to form transparent, glassy, thermally stable coatings is simplified.

Briefly, the present invention involves cyclopolysiloxanes of the formula:

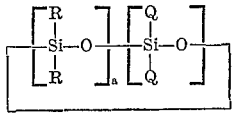

where R, Q, and $a$ are as previously defined. Among the aryl groups which R can represent are phenyl, ortho-tolyl, meta-tolyl, para-tolyl, meta-trifluoromethylphenyl, ortho-trifluoromethylphenyl, para-trifluoromethylphenyl, cyanophenyl, benzoylphenyl, xylyl, ethylphenyl, naphthyl, biphenyl, etc.

The compounds of the present invention are formed by the reaction of dichloro-bis-(p-phenoxyphenyl)silane with a symmetrical polysiloxanediol in the presence of a solvent and an acid acceptor, according to the equation:

(3)
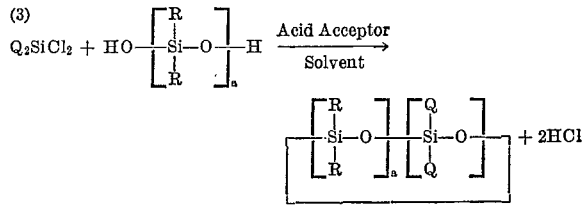

where R, Q, and $a$ are as previously defined.

Solvents utilizable for the reaction include essentially any organic material which is inert to the reactants under the conditions of the reaction. However, the preferred solvents are the hydrocarbons, such as benzene, toluene, xylene, pentane, hexane, heptane, etc. Polar solvents, such as ethers and ketones, are usable, but are not preferred. The polar solvents tend to keep the acid acceptor-hydrogen chloride salts formed in the reaction in solution. Any of the utilizable solvents can be mixed, that is, one solvent can be used for one of the reactants and a different solvent for the other reactant.

Preferably, the two reactants are added to a reaction vessel simultaneously, each being contained in a solvent medium. However, if desired, the chlorosilane can be added to a solvent solution of the polysiloxanediol. Since a cyclic polysiloxane is to be formed, the conditions of reaction should favor the formation of such a compound. In general, the more dilute the solution, the more the formation of a cyclic is favored. Thus, the final concentration should be no more than about 2 moles of total reactant per liter of solvent, and preferably no more than about 0.5 mole of total reactant per liter of solvent.

The product of the present invention can be formed with the two reactants shown in Equation 3 in a stoichiometric ratio of 1:1, or a 50% excess, based on the stoichiometric ratio, or either of the reactants can be used.

The acid acceptor absorbs generated hydrogen chloride in a molar ratio of 1:1. Since one mole of hydrogen chloride is generated for each mole of reactant, there must be at least one mole of acid acceptor for each mole of reactant. Preferably, the acid acceptor is present in an amount at least 50% in exess of the stoichiometric requirement and can be present in an excess of several hundred percent. Among the acid acceptors which can be utilized are the tertiary amines, including pyridine, picoline, 1,4-diazabicyclo(2,2,2)octane, and the dialkyl anilines.

The reaction can be conducted at any temperature from about 10° C. to the boiling point of the reaction mixture. Preferably, the reaction is conducted at room temperature both for convenience and because the reaction is accomplished rapidly, even at this temperature.

The reactants should be added over a period of from about 30 minutes to 2 hours, as an aid in assuring the formation of cyclics. The relatively slow addition rate prevents the concentration of reactants from rising beyond a desirable level and thus maintaining the dilute solution which promotes the formation of cyclics. Preferably, the reaction mixture is stirred for at least one hour following the addition to assure completion of the reaction.

Following completion of the addition and subsequent stirring, the reaction mixture is filtered to remove the acid acceptor-hydrogen chloride salts. The solvent is then evaporated and the resultant compound is further purified by recrystallization from hydrocarbon solvents, such as pentane, petroleum ether, hexane, and cyclohexane.

The preparation of the dichloro-bis-(p-phenoxy-phenyl) silane will now be described. All parts are by weight in the description. Into a nitrogen-filled reaction vessel was placed 122 parts of magnesium turnings. A solution containing 1250 parts of p-phenoxyphenylbromide in 1775 parts of anhydrous tetrahydrofuran was slowly added to the reaction vessel, with stirring, over a period of about one hour. The resulting mixture was stirred for about two more hours. A small amount of magnesium remained in the resulting thick, sludgy reaction mixture. The slurry was decanted from the remaining magnesium and the decanted material was added over a period of 45 minutes to 420 parts of silicon tetrachloride dissolved in 355 parts of diethyl ether. The mixture was allowed to stand, a large quantity of solids were removed by filtration, and the filtrate was distilled on a steam bath, the reaction vessel being placed under a slight vacuum. The residue was again filtered to remove additional solids and the resulting filtrate was vacuum distilled to give 180 parts of a liquid boiling at 215°–255° C. at 0.5 mm. Analysis of this product revealed that it was chiefly dichloro-bis-(p-phenoxyphenyl)silane, sufficiently pure for subsequent reaction.

The following examples will illustrate the formation of the products of the present invention. These examples should be considered as illustrative only, and not as limiting in any way the full scope of the invention as covered in the appended claims.

In some of the following examples, tolyl-substituted polysiloxanediols were utilized. The preparation of these materials will be illustrated by the preparation of sym-tetra-m-tolyldisiloxanediol. All parts in this illustration are again by weight. A solution containing 500 parts of ether, 120 parts of sodium bicarbonate, and a small quantity of water were placed in a reaction vessel. To the vessel was added a second solution containing 126.8 parts of sym-dichlorotetra-m-tolyldisiloxane in 250 parts of diethyl ether, over a period of 1.5 hours. The resulting slurry was stirred at room temperature for 18 hours, filtered, and the filtrate placed in a flash evaporator to remove the solvent. A 95% yield of crude product melting at 60°–68° C. was obtained. The crude product was recrystallized twice from petroleum ether and gave a material having the formula:

(4)

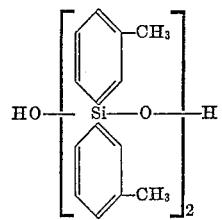

which had a melting point of 68.5°–69.5° C. By a similar procedure, hexa-p-tolyltrisiloxane-1,5-diol was prepared and had a melting point of 139°–141° C. The structure of each of the tolyl-substituted polysiloxanediols was substantiated by infrared analysis.

EXAMPLE 1

Into a reaction vessel were placed 12 ml. of pyridine and 100 ml. of benzene. Two 150 ml. solutions were prepared, the first containing 17.5 g. (0.04 mole) of dichloro-bis-(p-phenoxyphenyl)silane in benzene and the second containing 16.6 g. (0.04 mole) of sym-tetraphenyldisiloxanediol, also in benzene. The two solutions were added to the benzene-pyridine mixture simultaneously at room temperature, with stirring, at about the same rate over a period of 30 minutes. The reaction mixture was stirred for an additional three hours at room temperature following addition, and was then filtered. The filtrate was distilled on a steam bath resulting in a solid residue melting at about 130° C. The solid residue was recrystallized three times from cyclohexane and yielded 8.7 g. of product having the structure:

(5)

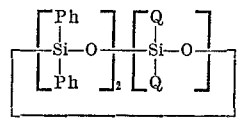

where Ph is the phenyl group, and Q is the para-phenoxyphenyl group. The melting point of this material was 174°–175° C. and its structure was substantiated by an infrared spectrum.

EXAMPLE 2

Into a reaction vessel are placed 80 ml. (1.0 mole) of pyridine and 500 ml. of pentane. Two solutions of 500 ml. are prepared, the first containing 122.5 g. (0.2 mole) of hexaphenyltrisiloxane-1,5-diol in pentane and the second containing 131 g. (0.3 mole) of dichloro-bis-(p-phenoxyphenyl)silane in pentane. Two two solutions are added simultaneously, at the same rate, to the pyridine-pentane mixture in the reaction vessel while stirring and stirring is continued for about two hours. The resulting solids are removed by filtration, the pentane removed from the filtrate by distillation, and the resulting product recrystallized by successive treatments with hexane to yield a product having the structure:

(6)

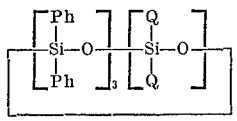

where Ph is the phenyl group and Q is the para-phenoxyphenyl group.

EXAMPLE 3

Into a reaction vessel are placed 73.5 ml. (0.75 mole) of 2-picoline and 300 ml. of toluene. Two 300 ml. solutions are prepared, the first containing 70.5 g. (0.15 mole) of sym-tetra-m-tolydisiloxanediol in toluene and the second containing 43.7 g. (0.1 mole) of dichloro-bis-(p-phenoxyphenyl)silane in toluene. The two solutions are added simultaneously, at an equal rate, to the picoline-toluene mixture in the reaction vessel, at room temperature over a period of about one hour while stirring. The reaction mixture is stirred for an additional hour and is then filtered to remove the amine-hydrogen chloride salts. The filtrate is heated to remove the toluene solvent and the residue is recrystallized several times from cyclopentane to yield the product having the formula:

(7)

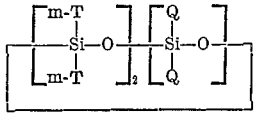

where m-T is the meta-tolyl group and Q is the p-phenoxyphenyl group.

EXAMPLE 4

Into a reaction vessel are placed 96 ml. of N,N-diethylaniline and 250 ml. of benzene. Two solutions of 250 ml. are prepared, the first containing 69.6 g. (0.1 mole) of hexa-p-tolyltrisiloxane-1,5-diol in benzene and the second containing 43.7 g. (0.1 mole) of dichloro-bis-(p-phenoxyphenyl)silane in benzene. The two solutions are added simultaneously, at the same rate, with stirring, to the aniline-benzene mixture in the reaction vessel. The resulting mixture is stirred for about two hours following addition and the mixture is then filtered to remove the aniline-hydrogen chloride salts. The benzene is evaporated from the filtrate and the residue is recrystallized several times with cyclohexane. The resulting product has the structure:

(8)

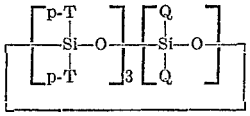

where p-T is the para-tolyl group and Q is the para-phenoxyphenyl group.

Into a reaction vessel was placed a quantity of the cyclotrisiloxane formed in Example 1. The compound was heated with stirring to 180° C., to form a molten mass. A quantity of potassium hydroxide, equivalent to 32 p.p.m. of potassium hydroxide based on the cyclotrisiloxane, was added. In a short time, polymerization was observed to take place. Heating was continued for an additional 5 minutes after which the polymer was allowed to cool to room temperature resulting in a transparent, glassy resin. The polymeric structure of:

(9)
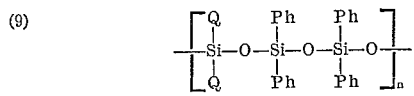

where Ph and Q are as defined above and $n$ is greater than 1, was substantiated by an infrared analysis. The polymer was soluble in trichlorethylene and benzene. The polymer of Formula 9 is extremely valuable as a coating material because of its high temperature stability. Since the polymer remains soluble in a solvent, such as trichlorethylene, its utility is enhanced as it may more easily be applied to the substrate to be coated.

A quantity of the cyclic compound of Example 3 is heated to a molten mass, with stirring. An amount of potassium hydroxide, equivalent to 40 p.p.m. based on the cyclic, is added and polymerization occurs rapidly. A solution is formed containing 100 parts of this polymer in 400 parts of trichlorethylene. A glass cloth is impregnated with this solution by dipping and the cloth is then wrapped around a dynamo electric machine coil. The coil is heated to about 60° C. to evaporate the trichlorethylene and the coil is then placed in an air circulating oven heated to about 200° C. for about two hours. The polymer is cross-linked by the heating through oxidation of the methyl portion of the tolyl group. The result is a coil insulated by the cured silicone-impregnated cloth.

The formulations and methods described in this application are not to be considered as limiting in any way the full scope of the invention as covered in the following claims.

What I claim as new and desire to secure by Letters Patent of the United States is:

1. A cyclopolysiloxane having the structure:

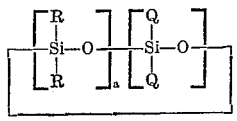

where R is a member selected from the class consisting of phenyl radicals and tolyl radicals, Q is the para-phenoxyphenyl group, and $a$ is an integral number of from 2 to 3, inclusive.

2. The cyclopolysiloxane:

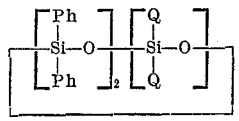

where Ph is the phenyl group and Q is the para-phenoxyphenyl group.

3. The cyclopolysiloxane:

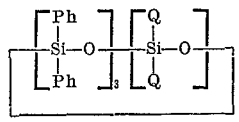

where Ph is the phenyl group and Q is the para-phenoxyphenyl group.

4. The cyclopolysiloxane:

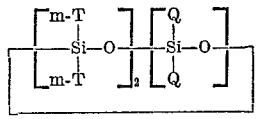

where m-T is the meta-tolyl group and Q is the para-phenoxyphenyl group.

5. The cyclopolysiloxane:

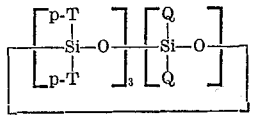

where p-T is the para-tolyl group and Q is the para-phenoxyphenyl group.

References Cited

UNITED STATES PATENTS 3,264,259  8/1966  Wu _____ 260—448.2 XR
3,328,346  6/1967  Sporck _____ 260—448.2 XR

FOREIGN PATENTS 1,386,960  12/1964  France.

TOBIAS E. LEVOW, *Primary Examiner.*

P. F. SHAVER, *Assistant Examiner.*